F. BABCOCK,

Assignor of one-half interest to F. BABCOCK.

Window Spring Catch.

No. 9,301. Reissued July 20, 1880.

Witnesses:

R. F. Gaylord,

J. J. Greene

Inventor:

F. Babcock,

By W. E. Simmons

Atty.

N. PETERS, PHOTO-LITHOGRAPHER, WASHINGTON, D. C.

UNITED STATES PATENT OFFICE.

FRANKLIN BABCOCK, OF MIDDLETOWN, CONNECTICUT, ASSIGNOR OF ONE-HALF OF HIS INTEREST TO FREDERICK BABCOCK.

WINDOW SPRING-CATCH.

SPECIFICATION forming part of Reissued Letters Patent No. 9,301, dated July 20, 1880.

Original No. 82,580, dated September 29, 1868. Application for reissue filed June 17, 1880.

*To all whom it may concern:*

Be it known that I, FRANKLIN BABCOCK, of Middletown, in the county of Middlesex and State of Connecticut, have invented an Improved Window Spring-Catch, of which the following is a description, reference being had to the accompanying drawings, where—

Figure 1:
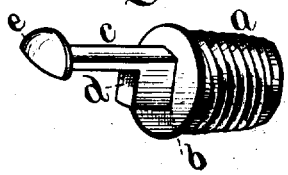
Figure 2:
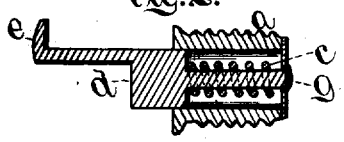
Figure 3:
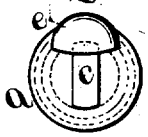
Figure 4:
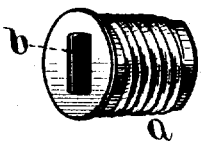
Figure 5:
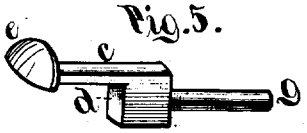

Figure 1 is a perspective view of a catch constructed in accordance with my invention. Fig. 2 is a view of the same in central vertical longitudinal section. Fig. 3 is a front-end view of the same. Fig. 4 is a detail view of the external case or shell. Fig. 5 is a detail view of the bolt and pintle or stem.

The letter *a* denotes a cylindrical case exteriorly screw-threaded, and intended to be thereby fastened into a suitable hole bored in the window-frame. The head or front end of this case is provided with a mortise, *b*, having flat sides, and corresponding substantially with the cross-section shape of the bolt *c* where it passes through and slides in this mortise, with the resultant effect that the mortise prevents the bolt from rotation in the case, and also gives the bolt both vertical and lateral support and bearing in actual use, the former against the weight of the window and the latter against lateral pressure exerted on the pressure-pad in the act of operating the catch.

The bolt *c* has the locking-shoulder *d*, designed to enter a mortise in the sash, and the pressure-pad *e*, designed for the application of pressure whereby to move the bolt backward in the case, the bolt being constantly pressed forward by the spring *f*, one end of which bears against the bolt and the other end of which bears against the rear wall of the case.

On the rear end of the bolt is the stem, shaft, or pintle *g*, giving support to the spring, taking a bearing in the rear wall of the case, and headed at the rear end to prevent undue forward movement of the bolt.

I claim as new—

1. In combination, the exteriorly-threaded case, the spring bearing on the bolt, and the bolt provided with the locking-shoulder and pressure-pad, all substantially as shown and described.

2. In combination, the exteriorly-threaded case, having in one end the mortise with flat sides and conforming to the cross-section shape of the bolt, the spring bearing on the bolt, and the bolt provided with locking-shoulder and pressure-pad, all substantially as shown and described.

3. In combination, the exteriorly-threaded case, the bolt provided with locking-shoulder and pressure-pad, the spring, and the stem supporting the spring, all substantially as shown and described.

FRANKLIN BABCOCK.

Witnesses:

ELIHU W. N. STARR,

FRANK F. STARR.